US011761622B2

(12) United States Patent
de Miranda Carvalho

(10) Patent No.: US 11,761,622 B2
(45) Date of Patent: *Sep. 19, 2023

(54) SYSTEM AND METHODS FOR INTEGRATION OF CONCENTRATED SOLAR STEAM GENERATORS TO RANKINE CYCLE POWER PLANTS

(71) Applicant: Marco Antonio de Miranda Carvalho, Oporto (PT)

(72) Inventor: Marco Antonio de Miranda Carvalho, Oporto (PT)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,133

(22) Filed: Jun. 7, 2021

(65) Prior Publication Data
US 2021/0293406 A1   Sep. 23, 2021

Related U.S. Application Data

(62) Division of application No. 16/492,638, filed as application No. PCT/IB2018/051328 on Mar. 2, 2018, now Pat. No. 11,060,716.
(Continued)

(51) Int. Cl.
*F22B 1/00* (2006.01)
*F22B 33/00* (2006.01)
(Continued)

(52) U.S. Cl.
CPC .............. *F22B 1/006* (2013.01); *F03G 6/065* (2013.01); *F03G 6/067* (2013.01); *F22B 1/1815* (2013.01);
(Continued)

(58) Field of Classification Search
CPC .... F22B 35/02; F22B 35/04; F22B 21/00–20; F22B 21/34–40; F22B 29/04;
(Continued)

(56) References Cited

U.S. PATENT DOCUMENTS 4,501,233 A * 2/1985 Kusaka ................. F01K 23/108
122/420
2007/0283906 A1* 12/2007 Albrecht ................. F22B 29/04
122/406.1
(Continued)

FOREIGN PATENT DOCUMENTS

GB        693532 A  *  7/1953
GB        722504 A  *  1/1955

*Primary Examiner* — Mark A Laurenzi
*Assistant Examiner* — Xiaoting Hu
(74) *Attorney, Agent, or Firm* — Z IP Law PLLC

(57) ABSTRACT

Solar/Rankine steam cycle hybrid concentrating solar power (CSP) systems and methods for designing or retrofitting existent natural circulation boilers using saturated or superheated steam produced by direct steam generation (DSG) or Heat Transfer Fluid (HTF) steam generators and CSP solar field technology systems are described. Additionally, methods and processes of retrofitting the existent Heat Recovery Steam Generators (HRSG) or biomass, gas, oil or coal fired boilers to operate integrated to a molten salt/water-steam heat exchangers are disclosed. The hybrid CSP systems are highly efficient due to the increase of steam generated by a heating section comprising either the DSG receiver or the molten salt-water-steam sequential heat exchangers, heaters, boiler/saturated steam generators, super-heaters and re-heaters. The additional saturated, superheated and reheated steam produced is directed to a Rankine cycle according to its pressure, temperature and steam quality significantly reducing the fuel consumption within a cogeneration or Combine Cycle Power Plant.

25 Claims, 3 Drawing Sheets

Related U.S. Application Data

(60) Provisional application No. 62/470,775, filed on Mar. 13, 2017.

(51) Int. Cl.

| | | |
|---|---|---|
| *F22B 29/04* | (2006.01) | |
| *F03G 6/06* | (2006.01) | |
| *F22B 1/18* | (2006.01) | |
| *F22B 37/72* | (2006.01) | |
| *F01D 15/10* | (2006.01) | |
| *F01K 23/10* | (2006.01) | |
| *F01K 7/22* | (2006.01) | |
| *F22B 21/02* | (2006.01) | |

(52) U.S. Cl.
CPC .............. *F22B 29/04* (2013.01); *F22B 33/00* (2013.01); *F22B 37/72* (2013.01); *F01D 15/10* (2013.01); *F01K 7/22* (2013.01); *F01K 23/106* (2013.01); *F05B 2220/301* (2013.01); *F22B 21/02* (2013.01)

(58) Field of Classification Search
CPC .......... F22B 37/70; F22B 37/72; F22B 1/006; F22B 1/1815; F22B 33/00; F22B 33/14; F22B 33/18; F03G 6/06–071; F01D 15/10; F05B 2220/301
See application file for complete search history.

(56) References Cited

U.S. PATENT DOCUMENTS

| | | | |
|---|---|---|---|
| 2008/0092551 A1* | 4/2008 | Skowronski | F22B 1/006 60/653 |
| 2014/0165572 A1* | 6/2014 | Pang | F01K 3/12 60/736 |
| 2015/0337811 A1* | 11/2015 | Chen | F22B 1/006 126/690 |
| 2016/0273406 A1* | 9/2016 | Olia | F22G 5/12 |

\* cited by examiner

SYSTEM AND METHODS FOR INTEGRATION OF CONCENTRATED SOLAR STEAM GENERATORS TO RANKINE CYCLE POWER PLANTS

BACKGROUND OF THE INVENTION

Field of the Invention

The present invention relates to apparatuses and systems that integrate a concentrated solar heating system for steam generation to a steam cycle power plant, and methods to operate the resulting hybrid solar-fuel fired or heat recovery Rankine cycle power plant.

Description of Related Art

In a known concentrated solar power system, a solar receiver comprising multiple heat panel tube arranged in the top portion of a solar tower collector heats the molten salt received from a cold storage tank, which is sent to a hot storage tank. The superheated steam is obtained in a sequence of heat exchangers, pre-heater, boiler and super-heater, between water received from boiler feed water pumps and the molten salt in a two-fluid heat transfer counter-flow loop to drive a Rankine cycle power block. An example of such a system is disclosed in US2013/0192586 A1.

In another known configuration, superheated steam is raised directly in multiple-pass, once-through, direct steam generation solar absorption devices. Such a configuration is shown in US 2011/0126824 A1 in which pre-heated water flow is pressurized by a booster feed pump into a multi pass receiver formed by an array of multiple parallel tubes that absorbs the solar irradiation concentrated by linear Fresnel reflector system.

US 2013/0118419 A1 discloses an embodiment describing the technology of the heat exchanger shell-tube, U-shaped pipe bundle type, receiving water as a shell-side fluid and thermal oil or molten salt as a pipe-side fluid. The entrance pre-heated water is evaporated by thermal contact with a heated heat transfer fluid which has been heated by, at least a solar tower, a linear Fresnel or a parabolic trough collector system.

In the Patent Application US 2011/0247335 A1, a combined cycle power plant including a heat recovery steam generator is provided wherein a high pressure (HP) steam generation section comprises a heating surface which can be operated as a once-through evaporator heating surface, known as the Benson principle.

Patent Application Publication US 2009/0241860 A1 discloses the application of the principles of a HP steam generation system, once-through or supercritical furnace. Accordingly, water-steam separating equipment such as steam drums or vertical separators, as well as downcomers, are not required during normal operation, however, vertical separators are typically supplied and used during start-up and low load operation.

All publications referred to herein are incorporated by reference to the extent not inconsistent herewith for purposes of meeting the written description and enablement requirements of Section 112 of the U.S. patent Code.

SUMMARY

Systems and apparatuses are provided for the integration of Rankine cycle power plants to a concentrated solar heating system.

The invention described herein includes methods of designing and retrofitting steam boilers of a Rankine cycle power plant in order to utilize an additional supply of saturated and superheated steam generated by the concentrated solar heating system.

According to advantageous method of operation described herein a concentrated solar boiler system can be integrated to a Rankine cycle power plant and can be dispatched simultaneously during the period of the day when the solar heat is available as Direct Normal Irradiance (DNI). The fuel consumption in the steam boiler of the Rankine cycle power plant or a combustion turbine in a combined cycle power plant can be reduced by a feedback control method based on process state variable inputs such as: DNI, steam pressure, temperature, mass flow rate and steam quality.

In a first aspect of the present disclosure, an apparatus for increasing the saturated steam generation in a steam boiler by means of solar energy collected via concentrated solar heating system, comprises:

(i) a water passage configured to convey pressurized water to the pre-heater stage of the solar boiler;

(ii) a pre-heater stage in the solar boiler configured to increase the feed water temperature up to its boiling point;

(iii) an evaporation stage, fluidly connected to the pre-heater stage in the solar boiler meant by design to evaporate the preheated feed water to produce steam which the quality is lower than 95%;

(iv) a mixed steam-water fluid passage configured to convey the steam flow generated by evaporation stage to the entrance of each boiler tube, meant by design to operate with quality steam lower than 15%;

(v) a first circulation stage, wherein separated saturated steam is directed to the super-heater stage and the hot water re-enters the circulation process;

In a second aspect of the present disclosure, an apparatus for increasing the temperature of the steam at the entrance of the superheater by means of solar energy in a steam boiler, comprises:

(i) a saturated steam passage configured to convey the steam from a steam boiler to a solar heating system, wherein the solar energy is transferred to the steam flow;

(ii) a superheated steam passage configured to return the superheated steam from a solar heating system to the entrance of a superheating stage of the boiler; wherein attemperators/de-super-heaters valves control the temperature of superheated steam;

In a third aspect of the present disclosure an apparatus for raising additional saturated steam by means of recovering the residual heat from flue gas in a hot path flow in the steam boiler, comprises:

(i) a flue-gas-to-Heat Transfer Fluid (HTF) heat exchanger in the hot gas path of the steam boiler, configured by design to transfer the heat from flue gas of a steam boiler to the HTF circuit;

(ii) a HTF-to-water heat exchanger, fluidly connected to a flue-gas-to-HTF heat exchanger meant by design to evaporate the preheated feed water to produce steam which the quality is lower than 95%;

(iii) a fluid passage circuit configured to convey the HTF from a flue-gas-to-HTF heat exchanger to HTF-to-water heat exchanger.

In a forth aspect of the invention, there is provided a method of operating a Rankine power plant integrated to a solar heating system according to the use of apparatuses provided in the first, second and third aspects of the present invention, comprising:

(i) Diverting a portion of the mass flow of the pressurized feed water from the steam boiler to the entrance of a solar heating system for raising saturated steam in accordance with the available solar heat input, Direct Normal Irradiance (DNI), accordingly to the first aspect of this invention;

(ii) Setting the fuel consumption of a steam boiler, considering the additional saturated steam generated by solar means, accordingly to the first aspect of this invention;

(iii) Increasing the temperature of the steam at the entrance of the super-heater in a steam boiler, in accordance with the second aspect of this invention.

The present invention is related to a system for integrating fluidly and functionally a Rankine cycle power plant to a concentrated solar steam generator in a hybrid, direct steam generation, fuel-fired boiler, cogeneration plant, comprising: a solar heating section (110) comprising: at least one solar receiver (115) configured to capture solar radiation and thereby generate saturated steam; at least one primary solar super-heater (111) configured to capture solar radiation and thereby generate superheated steam; (b) a solar steam transfer circuit (130), configured to convey the saturated and superheated steam generated by the solar heating section (110) to at least, one fuel-fired boiler (120); (c) at least one fuel-fired boiler (120), comprising an evaporation section (150) configured to raise saturated steam and superheated steam in a natural circulation evaporation loop; at least one primary super-heater (127) configured to convey superheated steam from the evaporation section (150) to a cogeneration section (140); (d) a cogeneration section (140) configured to partially expand the superheated steam in a (HP) turbine (142) and further expand re-heated steam in a (LP) turbine (143); and wherein the fuel consumption of the fuel-fired boiler (120) can be adjusted based on effective amounts of saturated and superheated steam produced in the solar heating section (110).

The system wherein the solar steam transfer circuit (130) comprises a steam injection valve (132) configured to control flow of the superheated steam received from the at least, one primary solar super-heater (111); a steam mixer valve (131) that controls flow from at least, one solar receiver (115); and at least one steam mixer injector (133) configured to attemperate the superheated steam received from steam injection valve (132) with the saturated steam received from saturated steam mixer valve (131).

The system comprising a plurality of boiler tubes (154) in a harp tube bundle (158) of the evaporation section (150); a harp header (152) of the evaporation section (150), the harp header (152) configured to inject the steam coaxially to the water flow at the entrance of each boiler tube (154) in the harp tube bundle (158); a steam injector (135) configured to convey steam from the at least one steam mixer injector (133) into the harp header (152) of the evaporation section (150); and wherein the temperature of the steam exiting harp tube bundle (158) of the evaporation section (150) can be set up to a value in a range of 5° C. to 10° C. above the temperature of the saturated steam raised in the plurality of boiler tubes (154) of the evaporation section (150).

The system comprising a booster feed-water pump (136) configured to raise the pressure of the water entering the solar heating section (110); a steam drum (156) of the evaporation section (150); and wherein the operation pressure in the solar heating section (110) is controlled in a range of 5 to 10 bar (absolute) above the operation pressure of the fuel-fired boiler (120) thereby creating and sustaining an upward velocity component of the low quality steam-water mixture flow entering the harp header (152) coaxially to the water flow at the entrance of each boiler tube (154) in the harp tube bundle (158); and wherein the saturated steam is thereby routed from the harp tube bundle (158) into the steam drum (156).

The system comprising cyclone separators (159) located inside the steam drum (156); and wherein the saturated steam and hot water mixture from the plurality of boiler tubes (154) of the harp tube bundle (158) is separated in the steam drum (156) into saturated steam and hot water.

The system comprising at least one downcomer (151) of the evaporation section (150); and wherein the difference of weights between the water column in the downcomer (151) and water/steam mixture column in the plurality of boiler tubes (154) results in buoyancy forces that create and sustain the upward flow of low quality steam, routing the saturated steam into the steam drum (156), completing the evaporation loop of the evaporation section (150).

The system comprising a steam mixer (139) upstream of the primary super-heater (127); and wherein additional superheated steam generated in the solar heating section (110) is injected in the fuel-fired boiler (120).

The present invention is further related to a system for integrating fluidly and functionally a Rankine cycle power plant to a concentrated solar steam generator in a hybrid, HTF-to-water-steam generation system, fuel-fired boiler, cogeneration plant, comprising a solar heat transfer loop (210) comprising at least one a solar receiver (214) configured to collect solar irradiation and transfer thermal energy to a heat transfer fluid (HTF); (b) a fuel-fired boiler (220) comprising at least one evaporation section (250) configured to raise saturated steam in a natural circulation loop; and at least one primary super-heater (224) configured to receive superheated steam from the at least one evaporation section (250); (c) an energy storage system (230) comprising at least one hot storage tank (231); and at least, a cold storage tank (232); (d) a cogeneration section (240) comprising a (HP) turbine (242);

a (LP) turbine (243); and wherein superheated steam partially expands in a (HP) turbine (242) and re-heated steam further expands in a (LP) turbine (243); and (e) a flue gas heat recovery circuit (260) comprising a flue gas path (228); at least one steam re-heater (263) configured to re-heat the HTF with recovered residual heat out of the flue gas in the hot flue gas path (228); and wherein fuel consumption of the fuel-fired boiler is reduced by pumping a portion of the HTF in the cold storage tank (232) to the hot storage tank (231) through the at least one a solar receiver (214).

The system wherein the at least one fuel-fired boiler (220) comprising a steam re-heater (226) configured to reheat partially expanded steam exiting the cogeneration section (240); an economizer (227) configured to preheat pressurized water; and a feed water pump (221) configured to pressurize condensate returning from the cogeneration section (240) to the operation pressure of the fuel-fired boiler (220).

The system wherein the at least one evaporation section (250) comprises a steam drum (251) configured to connect to the economizer (227) and receive the water-steam mixture through tubing (257); a downcomer (252) located downstream of the steam drum (251) and configured to connect to water distribution tubing (253); a re-boiler (218) connected to the water distribution tubing (253) and configured as a shell-water, HTF-in-tube heat exchanger; a harp tube bundle (256) comprising: a plurality of boiler tubes (254) connected to the re-boiler (218); and an upper header (255) connected to tubing (257) and configured to connect to the lower end of the boiler tubes (254); and wherein the at least one re-boiler (218) raises additional saturated steam in the steam-water circulating evaporation section (250).

The system wherein the solar heat transfer loop (210), comprises at least one HTF super heater (217) configured to pre-heat the saturated steam received from steam drum (251) by means of solar energy contained in the hot HTF flow received from a HTF header (236).

The system comprising at least one secondary super-heater (225) configured to pre-heat steam entering primary super-heater (224); at least one HTF primary super-heater (216) configured to transfer the HTF flow from HTF header (236) to the superheated steam conveyed from secondary super-heater (225); and wherein super-heated steam from primary super-heater (224) enters HP turbine (242) producing power.

The system comprising a re-heating steam circuit (270) comprising a low pressure steam passage (271) configured to receive steam exiting the HP turbine (242); at least one HTF re-heater (215) configured to transfer the HTF flow from HTF header (236) to the low pressure steam passage (271); and wherein the low pressure steam passage (271) passes low pressure superheated steam through the flue gas-to-steam re-heater (226) resulting in a high temperature low pressure superheated steam which is directed to the LP turbine (243).

The system comprising at least one attemperator valve (219) located downstream from the HTF header (236) and connected to the exit of at least one HTF re-heater (215) and to the exit of HTF primary super-heater (216); and wherein the temperature of the HTF at the entrance to the at least one HTF super heater (217) is increased.

The present invention is further related to a system for integrating fluidly and functionally a concentrated solar, HTF-to-water-steam generation system to a heat recovery steam generation (HRSG), combined cycle power plant, comprising a solar heat transfer circuit (310) comprising at least, a solar receiver (313), configured to collect the solar irradiation and transfer the solar thermal energy to a Heat Transfer Fluid (HTF); a Heat Recovery Steam Generator (HRSG) (320) comprising at least, a HP steam generation section (370); a solar heat storage system (330) comprising an HTF IP evaporator (312); at least one a hot storage tank (332) configured to receive hot HTF from the solar receiver (313); and a cold storage tank (331) configured to receive the returned cold HTF from the HTF IP evaporator (312); a combustion turbine (CT) section (380) comprising at least an electric generator (385); an air compressor (382); a gas turbine (383); and a combustion chamber (381); a steam turbine section (340) comprising at least one (HP) turbine (343) configured to expand the HP superheated steam raised in a HP steam generation section (370); and wherein the heat from exhaust gas from the combustion turbine CT section (380) is recovered and transferred to the water steam flow of the HP steam generation section (370).

The system wherein the HP steam generation section (370) of the HRSG (320) comprises a HP feed-water pump stage (323); a HP water pre-heater (378) connected to the HP feed-water pump stage (323); a first stage HP evaporation section, comprising a HP primary evaporator (374) supplied by the HP water pre-heater (378); and a downcomer (376) configured to direct flow from the HP primary evaporator (374) downward to a water distributor (377); a second stage HP evaporation section, comprising a HTF HP evaporator (314) supplied by the water distributor (377); and a HP secondary evaporator (375) supplied by the a HTF HP evaporator (314); a vertical water-steam separator (371) connected to the HP secondary evaporator (375); a HTF HP super-heater (315) configured to receive steam from the vertical water-steam separator (371); a return line (379) configured to receive water from the vertical water-steam separator (371) and connected to the first stage HP evaporation section; and a HP super-heater (372) connected to the HTF HP super-heater (315); and wherein the HP saturated steam is superheated and directed to the HP steam turbine (343).

The system wherein HRSG (320) comprising an IP steam generation section (360), comprising an IP feed-water pump stage (322); an IP water pre-heater (367) connected to the IP feed-water pump stage (323); an IP steam drum (361) supplied by the IP water pre-heater (367); a downcomer (362) configured to have feed-water from the IP steam drum (361) flow downward due to natural convection; a water distributor (363) configured to supply downward flow from the downcomer (362) to the HTF IP evaporator (312); a harp tube bundle comprising a plurality of boiler tubes (364) connected to the HTF IP evaporator (312); a harp collector (366) configured to supply IP saturated steam raised by both solar and hot exhaust gas recovery to the IP steam drum (361); a HTF-to-IP-steam pre-heater (311) configured to transfer the solar heat contained in a hot HTF flow to the saturated steam received from IP steam drum (361); an IP super-heater (369) configured to receive resulting IP super-heated steam heated by HTF-to-IP-steam pre-heater (311); and wherein IP super-heated steam from IP super-heater (369) is conveyed to IP steam turbine (342) and wherein steam expansion produces mechanical work which is converted into electrical energy.

The system wherein HRSG (320) comprising a LP steam generation section (350), comprising a LP feed-water pump (321); a LP water pre-heater (357) configured to pre-heat the feed-water flow; a LP steam-water loop connected to the LP water pre-heater (357), the LP steam-water loop comprising a LP steam drum (351); a downcomer (352) configured to have feed-water from the LP steam drum (351) flow downward due to natural convection; a feed line (353) connected to the downcomer (352); an IP steam injection header (317) configured to receive IP steam from the IP steam drum (361); a harp tube bundle comprising a harp header (355) connected to the downcomer (352) through feed line (353) and connected to injection header (317) to receive IP steam from the IP steam drum (361); a plurality of boiler tubes (354) connected to the harp header (355); and a harp collector (356) connected to the LP steam drum (351); a LP super-heater (359) configured to receive saturated steam from the LP steam drum (351); and wherein LP super-heated steam from LP super-heater (359) is conveyed to LP steam turbine (341) and wherein steam expansion produces mechanical work which is converted into electrical energy.

The system wherein the (HP) steam generation section (370) comprises a high pressure supercritical steam generating system, which can be configured by design with water steam separating equipment such as a vertical water-steam separator (371) and downcomer (376) be used when typically required during start-up or partial load operation and be capable to operate as a once-through or supercritical steam generator when solar heat is available.

These and other features, advantages and improvements according to this invention will be better understood by reference to the following detailed description and accompanying drawings.

BRIEF DESCRIPTION OF THE DRAWINGS

Embodiments of the present invention will now be described by way of example only, with reference to the accompanying drawings in which.

DETAILED DESCRIPTION OF THE INVENTION

The invention described herein relates to apparatuses, systems and methods for integrating and operating a concentrated solar heating system for steam generation to a Rankine cycle power plant. Methods are disclosed herein for designing and retrofitting a steam boiler in order to efficiently utilize a complementary steam source, and then integrating both saturated and superheated steam generated by solar radiation collecting means into a Rankine cycle plant.

In one embodiment, a hybrid concentrated solar—Rankine power plant may include a fossil or biomass fuel-fired steam generator, or any other type of fuel-fired boiler using any available fuel. Further, a combined cycle power plant may use exhausts of a gas turbine to generate steam in a heat recovery steam generator (HRSG), wherein an embodiment of the HRSG may also comprise a supplementary duct firing device.

The solar steam generator may be a concentrated solar heating system of any variety that uses mirrors to reflect and concentrate solar irradiation onto heat receivers comprising a tube or an array of tubes within a working fluid such as water, molten salt or any heat transfer fluid (HTF) in order to exchange solar heat with the in-tube HTF flow. The solar concentrator architecture may be a parabolic trough system, a linear Fresnel reflector system, a central tower receiver system, or another method or system of concentrating light by which solar energy is collected as heat in a solar radiation absorption device.

In an embodiment of the invention evaporator and super-heater stages may comprise one or more solar radiation absorption device in which the pre-heated feed water transferred from the steam boiler is directly boiled by direct contact with a heated element in the solar radiation absorption device.

Alternatively, in another embodiment, a pre-heater, an evaporator and a super-heater stage may comprise one or more heat exchangers with a heated HTF such as thermal oil or molten salt, which has been heated with solar energy collected by the solar heating system.

In a further embodiment, it is comprised one or more heat storage tanks wherein hot and cold HTF such as molten salt can be stored. The cold transfer fluid is heated with solar energy collected by the solar heating system and stored in the hot tank. During the hours when the solar irradiation is not available, the hot transfer fluid and pre-heated water can be directed through heat exchangers to raise saturated and superheated steam.

Figure 1:
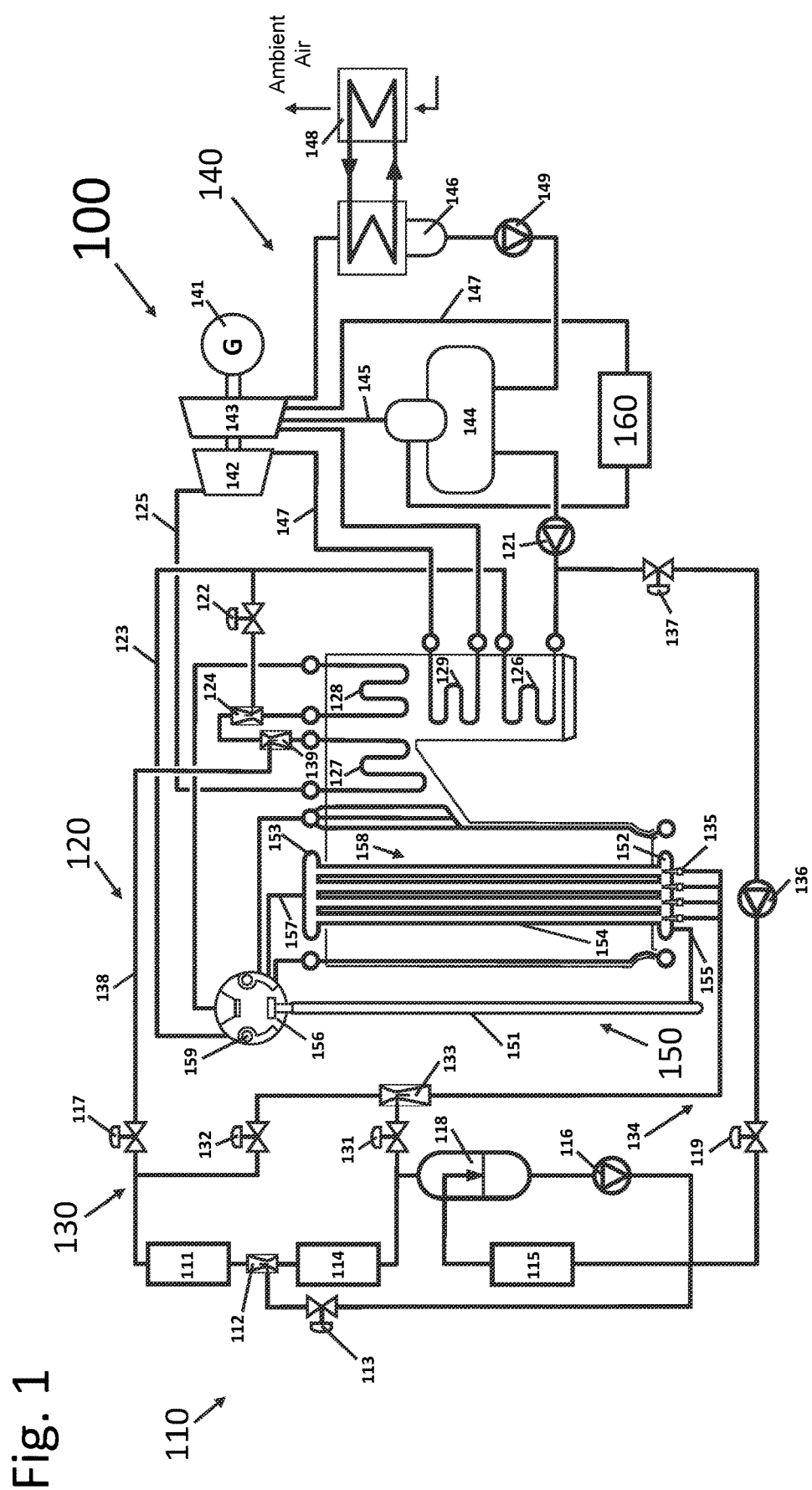
FIG. 1 is a schematic diagram of a hybrid concentrated solar heating system, direct steam generation, integrated to a fuel-fired boiler in a Rankine power plant in accordance with the present invention.

Referring now to the invention in more detail, in FIG. 1 there is shown an exemplary hybrid solar direct steam generation fuel-fired boiler, Rankine cycle, cogeneration plant, generally designated hybrid plant (100) comprising: a solar heating section (110), wherein the solar energy is collected and transferred to the working fluid, which is pressurized water; a fuel-fired boiler (120), wherein superheated steam is generated by means of burning fuel including an evaporation section (150) wherein saturated steam is generated in a natural circulation loop; a solar steam transfer circuit (130) which conveys the saturated and superheated steam generated by solar means to a fuel-fired boiler (120); a cogeneration section (140), wherein the superheated and re-heated steam are expanded in a turbine, generating power and industrial process steam; and an industrial steam consumer (160), wherein the low enthalpy steam exiting the generation section (140) is the heated working fluid of the industrial process.

The solar heating section (110) comprises: a condensate valve (119) which regulates the mass flow of the condensate diverted from the entrance of the economizer (126), in the fuel-fired boiler (120); a solar receiver (115), which raises saturated steam by concentrating solar energy means; a water-steam separation tank (118), wherein the saturated steam is separated from pressurized water and is connected to a saturated steam mixer valve (131); a condensate pump (116), which raises the pressure of the circulating water returned from water-steam separation process; a primary solar super-heater (111) and a secondary solar super-heater (114), wherein the saturated steam is superheated; a water injector (112) and an attemperation valve (113) which control the temperature of the superheated steam; and a super-heated steam valve (117) which controls the mass flow of the superheated steam generated by solar means.

The fuel-fired boiler (120) comprises: an evaporation section 150, wherein saturated steam is raised from pre-heated water in a natural circulation evaporation loop; a feed-water-pump (121), wherein feed-water is pressurized up to the operation pressure of the fuel-fired boiler (120); a flue-gas-to-water and steam heat exchanging circuit including an economizer (126), wherein the flue gas heat is transferred to the high pressure feed-water, a pre-heated water line (123) which conveys the pre-heated water to an evaporation section 150, a steam re-heater (129) wherein the flue gas heat is transferred to the low pressure superheated flow and the re-heated steam returns to a cogeneration section (140), a secondary super-heater (128) wherein saturated steam is superheated; a primary super-heater (127) wherein superheated steam temperature is raised up to the design operation point; a superheated steam line (125) which conveys the steam to a turbine located in a cogeneration section (140); and a de-super-heating circuit including attemperator valve (122) which controls the pre-heated water flow for attemperation process and an attemperation injector (124) which reduces the temperature of the super-heated steam by means of evaporating the hot water injected into the steam flow.

The water-steam loop in the evaporation section (150) comprises: a steam drum (156) which connects to the economizer (126) through the pre-heated water line (123) and receives the water-steam mixture through a steam-water line (157); a harp tube bundle (158) including a harp collector (153), boiler tubes (154) and a harp header (152), which connects to the steam distribution header (135) and receives steam from a solar steam injection circuit (134).

The solar steam transfer circuit (130) comprises: a steam mixer (139) located upstream of the primary super-heater (127) and a super-heated steam line (138) which connects the superheated steam valve (117) and conveys super-heated steam generated by solar means to the steam flow exiting an attemperation injector (124); a pressurized feed-water circuit including a feed-water valve (137), which controls the water mass flow entering the solar heating section (110) and locates downstream of a feed-water-pump (121), a booster feed-water pump (136) which increases the pressure of the water flow upstream of a condensate valve (119); a solar steam injection circuit (134), including at least one steam injector (135) which is installed in the harp header (152) for steam injection, coaxially to the entrance flow of each boiler tube (154); a steam injection valve (132), which controls the mass flow of the steam diverted from a super-heated steam line (138), a saturated steam mixer valve (131) and, a steam mixer injector (133) which attemperates the steam to be injected in the harp tube bundle (158).

The cogeneration section (140) comprises: an electric generator (141) in a single shaft connection with both the high pressure (HP) turbine (142) and the low pressure (LP) turbine (143); a steam condenser (146); condenser water-cooling circuit (148), which dissipate the heat from condensation process into the atmosphere; and a condensate pump (149), which circulates the condensate through a de-aerator (144).

The industrial steam consumer (160) connects to the LP turbine (143) through a controlled extraction de-aerator bleed-line (145) and the condensate from industrial process returns to the de-aerator (144) and further is directed to the feed water pump (121) located in the fuel-fired boiler (120).

In more detail, still referring to the invention in FIG. 1 the hybrid plant (100), can be operated when the solar heat is not available by burning the primary fuel in the fuel-fired boiler (120) which provides superheated steam to a power block (140) and saturated steam to an industrial steam consumer (160).

The steam expanded in the HP turbine (142) and LP turbine (143) is directed to, at least, one condenser (146), and the condensate re-enters the de-aerator (144) by means of a feed water pump (149) which raises the condensate pressure up to the de-aerator designed operating condition.

The boiler feed water pump (121) raises the pressure of the water leaving the de-aerator (144) up to the fuel-fired boiler (120) operational condition. The pressurized water enters an economizer (126), wherein is pre-heated and directed to the water recirculation system of the evaporation section (150) via steam drum (156), flowing downwards due to natural convection through the downcomer (151). The high-pressure water enters a harp tube bundle (158) via water distribution line (155), configured as a fluid passage to convey the preheated water into a harp header (152) to be evaporated in the boiler tubes (154). The difference of weights between the water column in the downcomer (151) and water/steam mixture column in the boiler tubes (154) is a resultant of buoyancy forces which creates and sustains the upward flow of the low-quality steam, routing the saturated steam into the steam drum (156), completing the evaporation loop.

The low-quality water/steam mixture produced in the boiler tubes (154) is separated into saturated steam and hot water by cyclone separators (159) located inside the drum (156). The hot water close to its saturation temperature flows by natural convection to the entrance of the downcomer (151) in another turn of the circulation process.

The saturated steam is dried prior to exiting the steam drum (156) and then, dried saturated steam is partially superheated in the secondary super-heater (128) and further in the primary super-heater (127), which is fluidly connected to the HP steam turbine (142), the superheated steam is partially expanded in the turbine and returned to a re-heater (129) and is supplied to the LP turbine (143) in which the steam is first expanded and partially bled to de-aerator (144), through a bleed-line (145), secondly expanded and partially bled to industrial steam consumer (160) through process bleed-line (147) and directed to the condenser (146), wherein heat is rejected to the ambient air and condensate is further directed to the circulation pump (149).

In the operation of a hybrid plant (100), when the solar heat is available the feed water mass flow is diminished at the entrance of the economizer (126), by operating a feed-water valve (137) in order to set the water mass flow entering the booster feed-water pump (136) which raises the pressure of the water entering the solar heating section (110) up to the design operation pressure.

The difference between the operation pressure in a solar heating section (110) and in a fuel-fired boiler (120) is controlled, in a range of 5 to 10 bar (absolute) in order to allow the saturated and superheated steam generated by solar means to be injected in fuel-fired boiler (120).

The feed water pressurized by booster feed-water pump (136) and regulated in pressure by the condensate valve (119) is mixed with the water flow of the solar boiler circulation loop pumped by a condensate pump (116) and the resultant water mass flow is boiled in the solar receiver (115).

The low-quality steam-water mixture enters water-steam separation tank (118), and the saturated steam can flow either towards the secondary solar super-heater (114) or through the steam mixer valve (131) which regulates the saturated steam mass flow to be injected in the solar steam injector (135). The superheated steam mass flow leaving the solar boiler section (110) via steam transfer line (138) is controlled by steam injection valve (132) and superheated steam valve (117). The temperature of the mixed steam entering the steam injector (135) can be set up to a value in a range of 5° C. to 10° C. above the temperature of the saturated steam boiled inside the boiler tubes (154).

In an advantageous method of entering the saturated steam generated by the solar boiler into the fuel-fired boiler (120), the steam injection circuit (134) conveys the steam to the steam injector (135), which injects the steam generated by solar means into the harp header (152), coaxially to the water flow at the entrance of each boiler tube (154), in the harp tube bundle (158).

In an advantageous method of entering the superheated steam generated by the solar boiler into the fuel fired boiler, the superheated steam generated in the super-heater (111) is conveyed by the superheated steam line (138) to the steam mixer (139) installed upstream of the primary super-heater (127).

The fuel consumption of the fuel-fired boiler (120) can be adjusted based on the effective amounts of saturated and superheated steam produced in the solar heating section (110), according to the solar resource, DNI.

Figure 2:
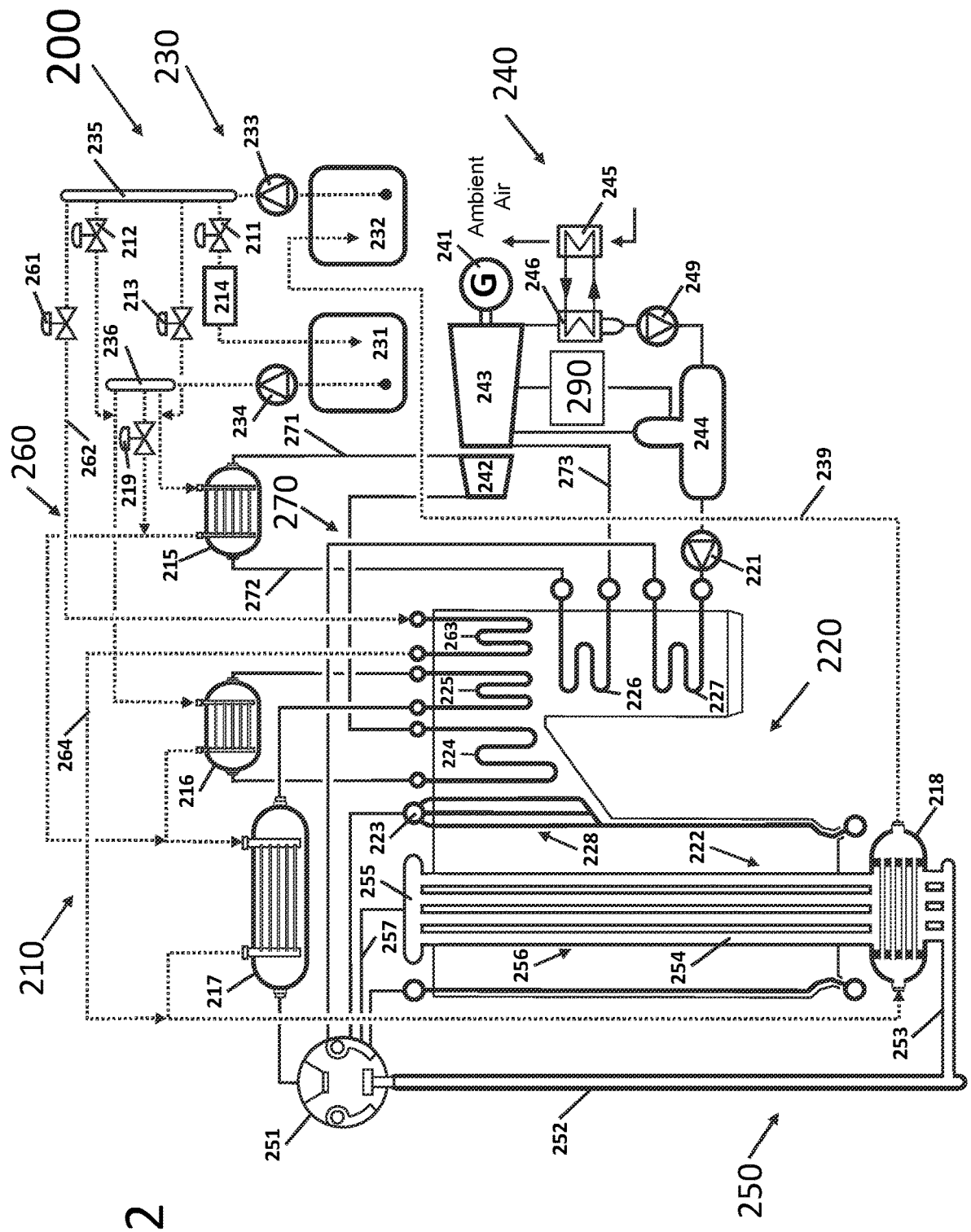
FIG. 2 is a schematic diagram of a hybrid concentrated solar heating system, heat transfer fluid, integrated to a fuel-fired boiler in a Rankine power plant in accordance with the present invention.

Referring now to the invention in more detail, in FIG. 2 there is shown an exemplary hybrid solar HTF-to-water-steam generation system integrated to a fuel-fired boiler, Rankine cycle, cogeneration plant, generally designated hybrid HTF-to-steam plant (200) comprising: a solar energy section including a solar heat transfer loop (210) and a heat storage stage (230); a heat recovery circuit (260); a fuel fired boiler (220) including an evaporation section (250); a cogeneration section (240) including an electric generator (241), which produces electric energy; a re-heating steam circuit (270); and an industrial steam consumer (290).

The solar heat transfer loop (210) comprises: a solar receiver (214), which collects the solar irradiation and transfers the thermal energy to a heat transfer fluid—HTF; a HTF re-heater (215), which connects to the HTF header (236) and transfers the solar energy contained in the hot HTF to superheated, low pressure steam flow in the re-heating steam circuit (270); a HTF primary super-heater (216), which transfers the solar energy contained in the hot HTF received from HTF header (236) to the super-heated steam exiting secondary super-heater (225), pre-heating the steam entering the primary super-heater (224); a HTF-to-saturated steam, namely the HTF super heater (217), which pre-heats the saturated steam received from steam drum (251) by means of solar energy contained in the hot HTF flow received from HTH header (236), regulated by attemperator valve (219); a HTF-to-water re-boiler (218), which is connected to the cold storage tank (232) through the HTF return line (239) in the energy storage system (230) and also connects to the downcomer (252) through water distribution tubing (253) and is located upstream of the boiler tubes (254) in the evaporation section (250).

The receiver valve (211) is located between the cold HTF header (235) and the solar receiver (214), which is connected to the hot storage tank (231).

In one HTF circuit meant by design to control the HTF temperature in the entrance of a HTF-to-steam heat exchanger, namely the HTF re-heater (215), an attemperation valve (213) is located downstream of the cold HTF header (235), and also connects to the hot HTF line downstream of the hot HTF header (236).

In another independent circuit to control the HTF temperature in the entrance of the HTF primary super-heater (216), an attemperation valve (212) is located downstream of the cold HTF header (235) and also connects to the hot HTF line downstream of the hot HTF header (236).

In a further independent circuit to increase the temperature of the HTF at the entrance of the HTF super heater (217), an attemperator valve (219) is located downstream of the hot HTF header (236) and also connects to the exit of the HTF re-heater (215), which further connects to the exit of the HTF primary super-heater (216).

The fuel-fired boiler (220) comprises: a flue gas path (228) and a circulating evaporation section (250). The flue gas path (228) comprises: a furnace (222) wherein the mixture of combustion air and fuel is burned and resultant hot combustion products pass through a sequence of heat exchangers flue-gas-to-working fluid (water, steam or HTF) including: the screening tubes (223), wherein pre-heated water is boiled to saturated steam; a primary super-heater (224) and a secondary super-heater (225), wherein saturated steam is superheated; a HTF steam re-heater (263), wherein HTF from cold storage tank (232) is heated by flue gas in the boiler (220); a steam re-heater (226), wherein partially expanded steam exiting the cogeneration section (240) is re-heated; an economizer (227), wherein pressurized water is pre-heated; and a feed water pump (221), wherein condensate returning from the cogeneration section (240) is pressurized up to operation pressure of the fuel-fired boiler (220).

The water-steam loop in the evaporation section (250) comprises: a steam drum (251) which connects to the economizer (227) and receives the water-steam mixture through tubing (257); a harp tube bundle (256) including the boiler tubes (254) connected to one upper header (255); a shell-water, HTF-in-tube heat exchanger, namely the re-boiler (218), which connects to the lower end of the boiler tubes (254); a downcomer (252) located downstream of the steam drum (251) and connected to the re-boiler (218) by a water distribution tubing (253).

The energy storage system (230) comprises: a hot storage tank (231), which receives the heated HTF from solar receiver (214); a cold storage tank (232) which receives the returned cold HTF from re-boiler (218); a HTF pump (233) which pressurizes the cold HTF into the cold HTF header (235); a HTF pump (234) which pressurizes the hot HTF into the HTF header (236).

The cogeneration section (240) comprises: an electric generator (241) in a single shaft connection with both the HP turbine (242) and the LP turbine (243); a steam condenser (246); water-to-air heat sink (245), which dissipates the heat from condensation process into the atmosphere; and a condensate pump (249), which circulates the condensate through a de-aerator (244). The industrial steam consumer (290) connects to the LP turbine (243) through a controlled extraction bleed line and the condensate from industrial process returns to the de-aerator (244) and further is directed to the feed water pump (221) located in the fuel-fired boiler (220).

The flue gas heat recovery circuit (260) comprises: a HTF valve (261) which controls the flow of the cold HTF and is located downstream of a cold HTF header (235); and a hot flue-gas-to-HTF heat exchanger, namely the steam re-heater (263), which connects to the HTF line exiting the HTF super heater (217).

The re-heating steam circuit (270) comprises: a low pressure steam passage (271) connecting the exit of the HP turbine (242) to the entrance of a HTF-to-steam heat exchanger, the HTF re-heater (215), which is also located in the solar heat transfer loop (210), downstream of the attemperation valve (213) and upstream of the HTF super heater (217); a flue-gas-to-steam heat exchanger, the re-heater (226), also located in the hot path gas (228) downstream of the secondary superheater (225) and upstream of a pre-heater (227); a low-pressure-high-temperature-steam-passage (273), directing the re-heated steam to the entrance of the LP turbine (243).

In more detail, still referring to one advantageous way of implementing the invention depicted in FIG. 2 the hybrid HTF-to-steam plant (200), can be operated even when the solar heat is not available by burning the primary fuel in the fuel-fired boiler (220) which provides superheated steam to the power and industrial steam co-generation section (240).

The HTF contained in the cold storage tank (232) can be pressurized by HTF pump (233) and the resultant HTF mass flow can be regulated by HTF valve (261) through the cold HTF header (235). The cold HTF flows through the feed line (262), entering the heat exchanger flue gas-to-HTF heat recovery (263) located in flue gas path (228), downstream of the secondary super-heater (225) in the fuel-fired steam boiler (220). The resultant hot HTF flows through HTF feed line (264) entering the re-boiler (218), wherein additional saturated steam is raised in the steam-water circulating evaporation section (250) without using solar energy. The cold HTF flow resultant of the heat exchanging process in re-boiler (218) returns to the cold storage tank (232) completing a flue gas-to-HTF, close loop, heat recovery saturated steam generation mode of operation disclosed herein.

In a natural convective circulation boiler, the pre-heated feed-water enters the steam-water circulating evaporation section (250) via steam drum (251), flowing downwards due to natural convection through the downcomer (252) in another turn of the natural circulation process. The pre-heated water enters into the water distribution tubing (253), configured as a fluid passage to convey the pre-heated water into HTF-to-water heat exchanger, the re-boiler (218). When a steam boiler (220) is operating in a very low capacity factor the natural circulation in the evaporation section (250) is sustained by buoyancy forces resultant of the difference between weight component of the water columns in the downcomer (252) and weight component of the water/steam mixture column in a boiler tube (254). The additional saturated steam generated by re-boiler (218) creates and sustains the upward flow of the low-quality steam-water mixture, routing the saturated steam into the steam drum (251), completing the evaporation loop.

In one advantageous method of operating a hybrid HTF-to-steam plant (200), when the solar heat is available, a portion of the HTF contained in a cold storage tank (232) is pumped by HTF pump (233) through a solar receiver (214) and the resultant hot HTF is transferred to a hot storage tank (231). A fuel-fired boiler (220) can operate in a low capacity factor under reduced fuel consumption mode and additional saturated steam can be generated in the re-boiler (218), superheated in HTF super heater (217) or in a HTF primary super-heater (216) and further re-heated in HTF re-heater (215) by means of solar energy transferred from HTF to the water-steam loop within a fuel-fired boiler (220).

A HTF pump (234) pressurizes a portion of the HTF contained in a hot storage tank (231) through the HTF header (236) and the resultant HTF flow is further distributed among the heat exchangers in the solar heat transfer loop (210) which transfers the solar heat to both boiler (220) and re-heating steam circuit (270) by means of HTF-to-water-steam heat exchangers.

In the re-boiler (218) a portion of the hot water conveyed from downcomer (252) by water distribution tubing (253) is evaporated and the low quality saturated steam-water mixture is conveyed to the entrance of each one of the boiler tubes (254) by convection in the natural circulation, evaporation section (250). The saturated steam flows from the upper header (255) of the harp tube bundle (256), through water-steam distribution tubing (257) to the steam drum (251), wherein the saturated steam is separated from water-steam mixture. In HTF super heater (217) the solar energy in the HTF flow received from (216) and mixed with the flow from HTF re-heater (215) is transferred to the saturated steam flow leaving the steam drum (251) and the resulting superheated steam flows to the secondary super-heater (225). In HTF primary super-heater (216), the solar heating in the HTF flow received from HTF header (236) and attemperated by valve (212) is transferred to the superheated steam conveyed from secondary super-heater (225). The resulting pre-heated steam is directed to primary super-heater (224) and further enters HP turbine (242) wherein expands producing power.

The low pressure superheated steam leaves (242) and circulates through the re-heating steam circuit (270) via low pressure steam passage (271) in a two-step re-heating process comprising: a pre-heating pass through in a HTF re-heater (215) wherein the solar heat contained in the HTF received from the HTF header (236) is transferred to the LP superheated steam; and a further pass through a flue gas-to-steam re-heater (226) through low pressure steam passage (272) resulting in a superheated steam which is directed via a low-pressure-high-temperature-steam-passage (273) to LP turbine (243).

Figure 3:
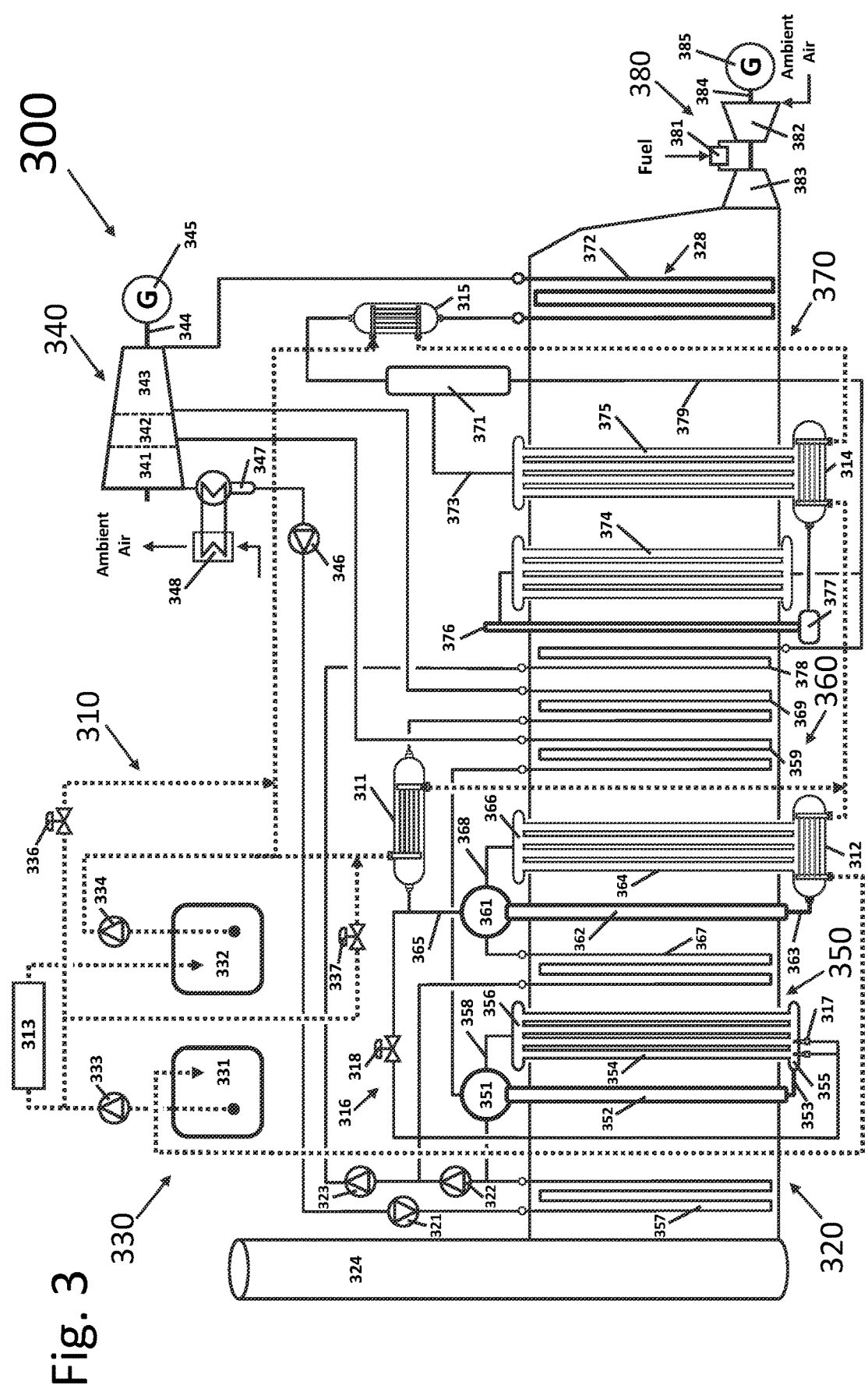
FIG. 3 is a schematic diagram of a hybrid concentrated solar heating system, HTF-to-water-steam generation system, integrated to a three pressure, Heat Recovery Steam Generation (HRSG), in a combined cycle plant in accordance with the present invention.

Referring now to the invention in more detail, in FIG. 3 there is shown an exemplary hybrid concentrated solar heating system, heat transfer fluid, integrated to a three pressure, heat recovery steam generation, combined cycle power plant, generally designated Hybrid HTF-to-steam combined cycle plant (300) comprising: a solar energy section including a solar heat transfer loop (310) and a solar heat storage system (330); a Heat Recovery Steam Generator (HRSG) (320) including: a Low Pressure (LP) steam generation section (350); an Intermediate Pressure (IP) steam generation section (360); a High Pressure (HP) steam generation section (370); a Steam Turbine (ST) section (340); and a Combustion Turbine (CT) section (380).

The solar heat transfer circuit (310) comprises: a solar receiver (313), which collects the solar irradiation and transfers the solar thermal energy to a Heat Transfer Fluid (HTF); a HTF-to-steam heat exchanger, namely the HTF HP super-heater (315) which is located downstream of the hot HTF pump (334) and transfers the solar heat contained in the hot HTF flow pumped from a hot storage tank (332) mixed with cold HTF provided by the attemperation valve (336) to the HP steam received from vertical water-steam separator (371), which is super-heated in the HP steam super-heater (372) and further directed to a Steam Turbine (ST) section (340); a HTF-to-pressurized-hot-water heat exchanger, namely the HTF HP evaporator (314) which is located downstream of the solar heat storage system (330) and transfers the solar energy contained in the hot HTF flow to the pre-heated water passing through the HP steam generation section (370); a HTF-to-saturated-steam heat exchanger, namely the HTF-to-IP-steam pre-heater (311), which is located downstream of the solar heat storage system (330) and transfers the solar heat contained in a hot HTF flow to the saturated steam received from IP steam drum (361); a HTF-to-pressurized-hot-water heat exchanger, namely the HTF IP evaporator (312) which is located upstream of the cold HTF storage tank (331) and transfers the solar energy contained in the hot HTF to a pre-heated-pressurized-hot-water received from downcomer (362) through LP water distributor (363).

In one HTF circuit meant by design to control the HTF temperature in the entrance of a HTF-to-IP-steam pre-heater (311), an attemperation valve (337) is located downstream of the cold HTF pump (333), and also connects to the hot HTF line downstream of the hot HTF pump (334).

In another independent circuit to control the HTF temperature in the entrance of a HTF HP super-heater (315), an attemperation valve (336) is located downstream of the cold HTF pump (333), and also connects to the hot HTF line downstream of the hot HTF pump (334).

In a further independent IP saturated steam circuit (316), the additional steam flow generated by means of solar energy is regulated by an IP steam valve (318) and conveyed to an IP steam injection header (317), which is installed coaxially to each boiler tube in the water distributor harp header (355).

The Heat Recovery Steam Generator (HRSG) (320) comprises: a chimney stack (324); a boiler feed-water pumping stage including a LP feed-water pump (321), an IP feed-water pump (322) and a HP feed-water pump (323); and a hot gas path (328) wherein the heat still available in exhaust gas from combustion turbine CT section (380) is recovered and transferred to the water-steam flow; a HP steam generation section (370), an IP steam generation section (360); and a LP steam generation section (350).

The energy storage system (330) comprises: a cold storage tank (331), which receives the returned cold HTF from HTF IP evaporator (312); a hot storage tank (332), which receives the returned hot HTF from solar receiver (313); a HTF pump (333) which pressurizes and circulates the cold HTF through the solar receiver (313); a HTF pump (334) which pressurizes the HTF flow through a solar heat transfer circuit (310); an attemperation valve (336) which controls the mass flow and temperature of the hot HTF at the entrance of the HTF HP super-heater (315); and an attemperation valve (337) which controls the mass flow and the temperature of the hot HTF at the entrance of the HTF-to-IP-steam pre-heater (311);

The low pressure LP steam generation section (350) comprises: a LP feed-water-pump (321) which raises the feed-water flow pressure from the exiting pressure of the condensate pump (346) to the low pressure (LP) operational design point; a LP water pre-heater (357) which pre-heats the feed-water flow; an LP steam-water loop including a steam drum (351) which receives the water-steam mixture through a collector line (358); a downcomer (352) wherein the pressurized-hot-water flows down-ward due to natural convection; a harp tube bundle including a harp collector (356), boiler tubes (354) and a harp header (355), which is connected to the downcomer (352) through feed line (353) and connects to the IP steam injection header (317) and receives IP steam from IP steam drum (361) and is also connected to the IP steam valve (318); an LP super-heater (359) wherein the LP saturated steam is superheated and directed to the LP steam turbine (341).

The intermediate pressure IP steam generation section (360) comprises: an IP feed-water-pump (322) which raises the feed-water flow pressure from low pressure (LP) to the intermediate pressure (IP) operational design point; an IP water pre-heater (367) which pre-heats the feed-water flow; an IP steam-water loop including an IP steam drum (361) which receives the water-steam mixture through an IP collector line (368); a downcomer (362) wherein the pressurized-hot water flows down-ward due to natural convection; a harp tube bundle including a harp collector (366), boiler tubes (364) which are connected to the HTF IP evaporator (312) wherein additional IP saturated steam is generated by solar means; an IP saturated steam line (365) which connects to the HTF-to-IP-steam pre-heater (311) wherein IP saturated steam is superheated by means of solar energy; an IP super-heater (369) wherein the LP saturated steam is superheated and directed to the IP steam turbine (342).

The high pressure HP steam generation section (370) comprises: a HP feed-water-pump stage (323) which raises the feed-water flow pressure from intermediate pressure (IP) to the high pressure (HP) operational design point; a HP water pre-heater (378) which heats up the pressurized-hot water flow entering a first stage of HP evaporation section; a HP primary evaporator (374), a downcomer (376) wherein the water flow is directed down-ward to a second stage of HP evaporation section; a water distributor (377) which directs the flow to the entrance of a HTF HP evaporator (314); a HP secondary evaporator (375); a HP collector line (373) which connects the evaporation section to the super-heating HP section; a vertical water-steam separator (371) which connects to HTF HP super-heater (315); a recirculation water line (379) which returns the pressurized-hot water to the first stage of HP evaporation section; and a HP super-heater (372) wherein the HP saturated steam is superheated and directed to the HP steam turbine (343).

Alternatively, the (HP) steam generation section (370) can be configured by design and operated as one once-through or supercritical steam generator. Accordingly, a water steam separating equipment such as a vertical water-steam separator (371) and downcomer (376) are typically operating during start-up and partial load operation. The heated feed-water from a (HP) water pre-heater (378) is thus conveyed via a feed-water line to the bottom of the (HP) primary evaporator (374). Due to the higher operating pressure in the supercritical range, i.e., in excess of 221 bar (absolute) there is never any distinct water-steam interface.

The steam turbine section (340) comprises: an electric generator (345); HP turbine (343); IP turbine (342) and the LP turbine 341; a steam condenser (347); water-to-air heat sink (348) wherein the rejected heat from steam cycle is transferred to the ambient air; and a condensate pump (346), which circulates the condensate from the steam condenser (347) to the LP feed-water-pump (321).

The combustion turbine CT section (380) comprises: an electric generator (385); an air compressor (382); a gas turbine (383); and a combustion chamber (381).

In more detail, still referring to one advantageous way of implementing the invention depicted in FIG. 3, the hybrid plant (300), can be operated even when the solar heat is not available by burning the primary fuel in a combustion chamber (381) of a combustion turbine CT section (380). By means of a CT shaft (384), the mechanical work resulting of the hot gas expansion in the gas turbine (383) is transferred to the air compressor (382) and to a rotor of a generator (385) which produces electric energy.

The exhaust gases generated in combustion section (380) enter the HRSG (320) via a hot path gas (328) and transfer the recovered heat from combustion products expanded in the gas turbine (383) to the water-steam flow circuit by means of a sequence of heat exchangers comprising: a HP steam generation section (370), which raises HP steam from water pressurized by HP feed water pump (323); an IP steam generation section (360), which raises IP steam from water pressurized by IP feed water pump (322); and a LP steam generation section (350), wherein LP steam is raised from water pressurized by LP feed water pump (321). After completing a once through pass the flue gases leave the HRSG (320) through a chimney stack (324).

The steam expanded in the steam turbine section (340) is directed to the condenser (347) and the condensate thus produced is returned to the LP feed-water-pump (321) by means of a condensate pump (346). The mechanical work produced simultaneously by the expansion of the super-heated steam in each of the HP, IP and LP steam turbines is transferred simultaneously to the steam turbine ST shaft (344), which conveys mechanical energy to the ST electric generator (345), to be converted into electric energy. The combined cycle nominal gross output is the result of simultaneous operation of (345) and (385) in a combined cycle mode.

In one advantageous method of operating a hybrid HTF-to-steam combined cycle plant (300), when the solar heat is available, a portion of the HTF contained in a cold storage tank (331) is pumped by a cold HTF pump (333) through a solar receiver (313) and the resultant hot HTF is directed to a hot storage tank (332). A hot HTF pump (334) pressurizes and distributes a portion of the hot HTF among the HP steam generation section (370) and IP steam generation section (360). A combustion turbine (CT) section (380) can operate in a low capacity factor under reduced fuel consumption mode at the same time some additional IP saturated steam can be generated by means of solar energy transferred from HTF to the water-saturated steam loop in the HTF IP evaporator (312) and further superheated in HTF-to-IP-steam pre-heater (311) within an IP steam generation section (360).

Another portion of IP saturated steam can be generated by solar means in the HTF IP evaporator (312) and collected in IP steam drum (361). This IP saturated steam can be directed through IP saturated steam circuit (316) and further injected coaxially to each boiler tube in the water distributor harp header (355) by IP steam injection header (317).

In the IP steam generation section, the HTF flows from hot HTF pump (334) through HTF-to-IP-steam pre-heater (311) and further via HTF IP evaporator (312).

In the HTF IP evaporator (312), hot water conveyed from IP steam drum (361) via downcomer (362) is evaporated and the low quality saturated steam raised by solar means is conveyed to the entrance of each one of the boiler tubes (364) by convection in the natural circulation evaporation section within (360). The IP saturated steam raised by both solar and hot exhaust gas recovery means are conveyed via IP collector line (368) to IP steam drum (361), wherein the saturated steam is separated from water. In HTF-to-IP-steam pre-heater (311), the solar energy in the HTF flow received from HTF pump (334) and attemperated by valve (337) is transferred to the IP saturated steam exiting IP steam drum (361) and a resulting IP superheated steam is conveyed to an IP super-heater (369) for completing the superheating process and further being conveyed to IP steam turbine (342) wherein the steam expansion produces mechanical work which is converted into electric energy by generator (345).

Additional HP saturated steam can also be generated by solar means in the HTF HP evaporator (314) and super-heated in HTF HP super-heater (315) within a HP steam generation section (370).

In the HP steam generation section, the HTF flows from HTF pump (334) through HTF HP super-heater (315) and further via HTF HP evaporator (314). The HTF exiting the HTF HP evaporator (314) is mixed with the HTF exiting the HTF-to-IP-steam pre-heater (311) and resultant HTF flow passes through HTF IP evaporator (312) and further to the cold HTF storage tank (331).

In the HTF HP evaporator (314), hot water conveyed from downcomer (376) via water distributor (377) is evaporated and the low quality saturated steam raised by solar means is conveyed through boiler tubes (374) and mixes with saturated steam raised by hot exhaust gas recovery means. The mixed water and HP saturated steam is conveyed to vertical water-steam separator (371) via HP collector line (373), wherein the saturated steam is separated from water. The separated water in vertical water-steam separator (371) returns to HP primary evaporator (374) via recirculation water line (379), whenever HP steam generation section (370) operates in partial load mode.

In HTF HP super-heater (315), the solar energy in the HTF flow received from hot HTF pump (334) and mixed with cold HTF provided by an attemperation valve (336) is transferred to the HP saturated steam exiting vertical water-steam separator (371) and a resulting HP superheated steam is conveyed to a HP steam super-heater (372) for completing the superheating process and further being conveyed to HP turbine (343) wherein it is expanded and mechanical work is converted into electric energy by an electric generator (345).

The foregoing written description has been depicted to enable those of ordinary skill to understand and appreciate the existence of modifications and that many variations of such an invention are possible in light of the present disclosure. It will be evident that features may be added or subtracted as desired and various modifications and changes may be made thereto without departing from the broader spirit or essential characteristics thereof. The scope of the invention is not to be restricted except in light of the appended claims and their equivalents.

What is claimed is:

1. A system for integrating fluidically and functionally a steam generator in a Rankine cycle power plant, comprising:
at least one natural circulation steam generator, comprising:
a downcomer and a plurality of boiler tubes in a harp tube bundle configured to raise saturated steam in a natural circulation evaporation loop;
a steam injection valve configured to control the mass flow of steam diverted from a superheated steam line to a steam mixer injector;
a saturated steam mixer valve configured to regulate saturated steam mass flow to the steam mixer injector;
at least one steam injector configured to be located at an entrance of each boiler tube of the plurality of boiler tubes of the at least one natural circulation steam generator, the at least one steam injector configured to inject steam coaxially to an upward flow of steam and water at the entrance of each boiler tube and thereby create and sustain the upward flow of steam and water in the plurality of boiler tubes, preventing flow stagnation in the steam generation process;
wherein the steam mixer injector is configured to control and regulate superheated steam and saturated steam to set the temperature of mixed steam entering the at least one steam injector; and
wherein the injected steam increases the quality and reduces the specific weight of the water-steam mixture, resulting in buoyancy forces that create and sustain the upward flow of steam and water in the plurality of boiler tubes, preventing flow stagnation in the steam generation process.

2. The system of claim 1 wherein the steam injected is a mixture of superheated and saturated steam.

3. The system of claim 1, comprising at least one heating section configured to generate saturated steam.

4. The system of claim 3 wherein the at least one heating section comprises a solar receiver to generate the saturated steam.

5. The system of claim 1, comprising:
at least one super-heater configured to generate super-heated steam.

6. The system of claim 5 wherein the at least one super-heater comprises a solar receiver to generate the superheated steam.

7. The system of claim 1, wherein the steam mixer injector is configured to attemperate superheated and saturated steam fed to the at least one steam injector.

8. The system of claim 1, comprising:
a booster feed-water pump configured to control the pressure; and
wherein an operation pressure of the flow is controlled in a range of 5 bar to 10 bar (absolute) above an operation pressure of the at least one natural circulation steam generator thereby creating and sustaining an upward velocity component of a low-quality steam-water mixture flow at the entrance of the plurality of boiler tubes in the harp tube bundle.

9. The system of claim 1, comprising a steam drum having a plurality cyclone separators; and
wherein a saturated steam and hot water mixture from the plurality of boiler tubes of the harp tube bundle is separated in the steam drum into saturated steam and hot water.

10. A system for integrating fluidically and functionally a steam generator in a Rankine cycle power plant, comprising:
at least one natural circulation steam generator, comprising:

a downcomer and a plurality of boiler tubes in a harp tube bundle configured to raise saturated steam in a natural circulation evaporation loop;

at least one shell-water, heat transfer fluid (HTF)-in-tube heat exchanger configured to be installed downstream of the downcomer and upstream of the plurality of boiler tubes of the at least one natural circulation steam generator, the at least one shell-water, HTF-in-tube heat exchanger configured to heat and evaporate the upward flow of steam and water at the entrance of each of the plurality of boiler tubes; and wherein the additional saturated steam generation due to the at least one shell-water, HTF-in-tube heat exchanger increases the quality and reduces the specific weight of the water-steam mixture, resulting in buoyancy forces that create and sustain the upward flow of steam and water in the plurality of boiler tubes, preventing flow stagnation in the steam generation process.

11. The system of claim 10, comprising at least one heating section configured to heat the heat transfer fluid in the at least one shell-water, HTF-in-tube heat exchanger.

12. The system of claim 11 wherein the at least one heating section comprises a solar receiver.

13. The system of claim 10, comprising at least one heat transfer fluid (HTF) primary super-heater configured to superheat the saturated steam raised in the evaporation loop.

14. The system of claim 13, comprising a flue gas heat recovery circuit having a flue gas path, and at least one flue gas-to-HTF re-heater configured to re-heat the heat transfer fluid (HTF) with recovered residual heat from a flue gas in the flue gas path.

15. The system of claim 14, further comprising:
at least one attemperator valve connected to an exit of the at least one HTF re-heater and to an exit of the at least one HTF primary super-heater; and
wherein a temperature of the heat transfer fluid (HTF) at an entrance to the at least one HTF super heater is increased.

16. A system for integrating fluidically and functionally a steam generator in a Rankine cycle power plant, comprising:
at least one natural circulation steam generator, comprising:
a downcomer and a plurality of boiler tubes in a harp tube bundle configured to raise saturated steam in a natural circulation evaporation loop;
a plurality of heat exchangers selected from a group consisting of:
(A) a steam injector configured to be located at an entrance of each boiler tube of the plurality of boiler tubes of the at least one natural circulation steam generator, the steam injector configured to inject steam coaxially to an upward flow of steam and water at the entrance of each boiler tube and thereby create and sustain the upward flow of steam and water in the plurality of boiler tubes, preventing flow stagnation in the steam generation process;
(B) a shell-water, heat transfer fluid (HTF)-in-tube heat exchanger configured to be installed downstream of the downcomer and upstream of the plurality of boiler tubes of the at least one natural circulation steam generator, the at least one shell-water, HTF-in-tube heat exchanger configured to heat and evaporate the upward flow of steam and water at the entrance of each of the plurality of boiler tubes; and
wherein the additional saturated steam generation due to the plurality of heat exchangers results in buoyancy forces that create and sustain the upward flow of steam and water in the plurality of boiler tubes, preventing flow stagnation in the steam generation process.

17. The system of claim 16, comprising:
an economizer configured to preheat pressurized water;
a steam drum configured to connect to the economizer to receive the preheated pressurized water from the economizer;
wherein the downcomer is located downstream of the steam drum and configured to connect to a water distribution tubing;
wherein the at least one of the plurality of heat exchangers is connected to the water distribution tubing;
wherein the plurality of boiler tubes is connected to the at least one of the plurality of heat exchangers; and
wherein the at least one of the plurality of heat exchangers raises additional saturated steam in the evaporation loop.

18. The system of claim 16, comprising:
at least one primary super-heater configured to heat the saturated steam received from the steam drum;
at least one secondary super-heater configured to heat steam entering the at least one primary super-heater;
at least one heat transfer fluid (HTF) super-heater configured to transfer heat transfer fluid (HTF) flow to the superheated steam conveyed from the at least one secondary super-heater.

19. The system of claim 16, wherein at least one of the plurality of heat exchangers includes a shell-water, HTF-in-tube heat exchanger configured to be a heat transfer fluid-intermediate pressure (HTF-IP) evaporator.

20. The system of claim 19, comprising:
an energy storage system comprising:
at least one hot storage tank configured to receive heated heat transfer fluid (HTF) and to convey the heated heat transfer fluid (HTF) to the heat transfer fluid-intermediate pressure HTF-IP evaporator; and
at least one cold storage tank configured to receive cold heat transfer fluid (HTF) returned from the HTF-IP evaporator.

21. The system of claim 16, comprising:
a combustion turbine (CT) section comprising:
at least one electric generator;
an air compressor;
a gas turbine; and
a combustion chamber;
wherein the at least one natural circulation steam generator is a Heat Recovery Steam Generator (HRSG) comprising a high pressure (HP) steam generation section;
wherein heat from exhaust gas from the combustion turbine (CT) section is recovered and transferred to the water steam flow of the HP steam generation section; and
wherein a steam turbine of a power generation section comprises at least one high pressure (HP) steam turbine configured to expand HP superheated steam raised in the HP steam generation section.

22. The system of claim 21, wherein the HP steam generation section of the HRSG comprises:
a high pressure (HP) feed-water pump stage;
a HP water pre-heater connected to the HP feed-water pump stage;
a first stage HP evaporation section, comprising:
a HP primary evaporator supplied by the HP water pre-heater; and
a HP downcomer configured to direct flow from the HP primary evaporator downward to a water distributor;

a second stage HP evaporation section, comprising:
a heat transfer fluid-high pressure (HTF-HP) evaporator supplied by the water distributor; and
a HP secondary evaporator supplied by the HTF-HP evaporator;
a vertical water-steam separator connected to the HP secondary evaporator;
a HTF-HP super-heater configured to receive steam from the vertical water-steam separator;
a return line configured to receive water from the vertical water-steam separator and connected to the first stage HP evaporation section; and
a HP super-heater connected to the HTF-HP super-heater; and
wherein HP saturated steam is superheated and directed to the at least one HP steam turbine.

23. The system of claim 22, wherein the high pressure (HP) steam generation section comprises a high-pressure supercritical steam generating system; and
wherein the vertical water-steam separator and the HP downcomer are used during start-up or partial load operation to operate the HP steam generation section as a once-through or supercritical steam generator when heat is available.

24. The system of claim 21, wherein the HRSG comprises an intermediate pressure (IP) steam generation section, the IP steam generation section comprising:
an IP feed-water pump stage;
an IP water pre-heater connected to the IP feed-water pump stage;
an IP steam drum supplied by the IP water pre-heater;
wherein the downcomer is an IP downcomer and is configured to have feed-water from the IP steam drum flow downward due to natural convection;
a water distributor configured to supply downward flow from the IP downcomer to a HTF-IP evaporator;
wherein the harp tube bundle is an IP harp tube bundle, and the plurality of boiler tubes of the IP harp tube bundle is connected to the HTF-IP evaporator;
a harp collector configured to supply IP saturated steam raised by both hot HTF and hot exhaust gas recovery to the IP steam drum;
a HTF-to-IP-steam pre-heater configured to transfer the heat contained in a hot HTF flow to the IP saturated steam received from the IP steam drum; and
an IP super-heater configured to receive IP superheated steam heated by the HTF-to-IP-steam pre-heater;
wherein the steam turbine of the power generation section further comprises an IP steam turbine, wherein IP superheated steam from the IP super-heater is conveyed to the IP steam turbine, and wherein steam expansion produces mechanical work which is converted into electrical energy.

25. The system of claim 24, wherein the HRSG further comprises a low pressure (LP) steam generation section, the LP steam generation section comprising:
a LP feed-water pump;
a LP water pre-heater configured to pre-heat a feed-water flow from the LP feed-water pump;
a LP steam-water loop connected to the LP water pre-heater, the LP steam-water loop comprising:
a LP steam drum;
a LP downcomer configured to have feed-water from the LP steam drum flow downward due to natural convection;
a feed line connected to the LP downcomer;
an IP steam valve located downstream of the IP steam drum;
an LP steam injection header configured to receive saturated steam with regulated pressure and mass flow from the IP steam valve;
a LP harp tube bundle comprising:
a harp header connected to the LP downcomer through the feed line to receive the LP steam from the LP steam drum and connected to the LP steam injection header;
a plurality of boiler tubes connected to the harp header;
a harp collector connected to the LP steam drum;
a LP super-heater configured to receive LP saturated steam from the LP steam drum;
wherein the steam turbine of the power generation section further comprises a LP steam turbine;
wherein LP superheated steam from the LP super-heater is conveyed to the LP steam turbine; and
wherein steam expansion produces mechanical work which is converted into electrical energy.

* * * * *